United States Patent
Warwick

[11] 3,800,920
[45] Apr. 2, 1974

[54] SELF-ENERGIZED DISC BRAKE PARKING BRAKE INTEGRAL WITH A NON-ENERGIZED SERVICE DISC BRAKE

[75] Inventor: Edward H. Warwick, Englewood, Ohio

[73] Assignee: General Motors Corp., Detroit, Mich.

[22] Filed: Apr. 27, 1973

[21] Appl. No.: 355,189

[52] U.S. Cl............ 188/106 F, 188/71.9, 188/73.1, 188/250 B
[51] Int. Cl......................... F16d 65/14, F16d 55/46
[58] Field of Search.............. 188/106 F, 72.6, 73.1, 188/72.2, 71.9, 250 B; 192/83, 107 R, 85 AA

[56] References Cited
UNITED STATES PATENTS
| | | | |
|---|---|---|---|
| 3,456,765 | 7/1969 | Meier | 188/72.6 |
| 3,422,933 | 1/1969 | VanHouse et al. | 188/72.2 |
| 3,047,098 | 7/1962 | Olley | 188/72.6 |

*Primary Examiner*—George E. A. Halvosa
*Assistant Examiner*—Charles E. Frankfort
*Attorney, Agent, or Firm*—D. D. McGraw

[57] ABSTRACT

A disc brake assembly which contains a self-energized parking brake and a non-energized service brake. The service brake is actuated hydraulically, with fluid pressure acting on an inboard shoe peripheral section through the piston. An inboard shoe central section fitting within an opening of the shoe peripheral section is actuated mechanically through a self-energizing mechanism to provide parking brake capability. The two shoe sections have an overlapping construction such that movement of the peripheral section into braking engagement with the disc is transmitted to the shoe central section to also engage it with the disc. However, during the parking brake mode of operation only the central section engages the disc in braking relation. The brake mechanism is automatically adjusted as the brake shoes wear.

4 Claims, 2 Drawing Figures

PATENTED APR 2 1974 3,800,920

SELF-ENERGIZED DISC BRAKE PARKING BRAKE INTEGRAL WITH A NON-ENERGIZED SERVICE DISC BRAKE

The invention relates to an automotive disc brake unit having both service brake and parking brake capability. The service brake mode is accomplished through hydraulic pressure, and the parking brake mode is accomplished through mechanical actuation. The structure for mechanically actuating the brake includes a self-energizing mechanism of the ball and ramp type. When the unit functions as a hydraulic disc brake, fluid pressure acts on a piston and the caliper housing to force the piston against a peripheral portion of a brake pad assembly. The peripheral brake pad assembly portion is so constructed in relation to the central portion of the brake pad assembly that the peripheral portion also moves the central portion against one side of the disc. The pressure reaction on the caliper housing causes the housing to slide in its mounting bracket so as to move the outboard brake pad assembly against the disc. The piston is annular in form and is located in an annular cylinder, with the mechanical brake actuating mechanism extending through the cylinder annulus.

Figure 1:
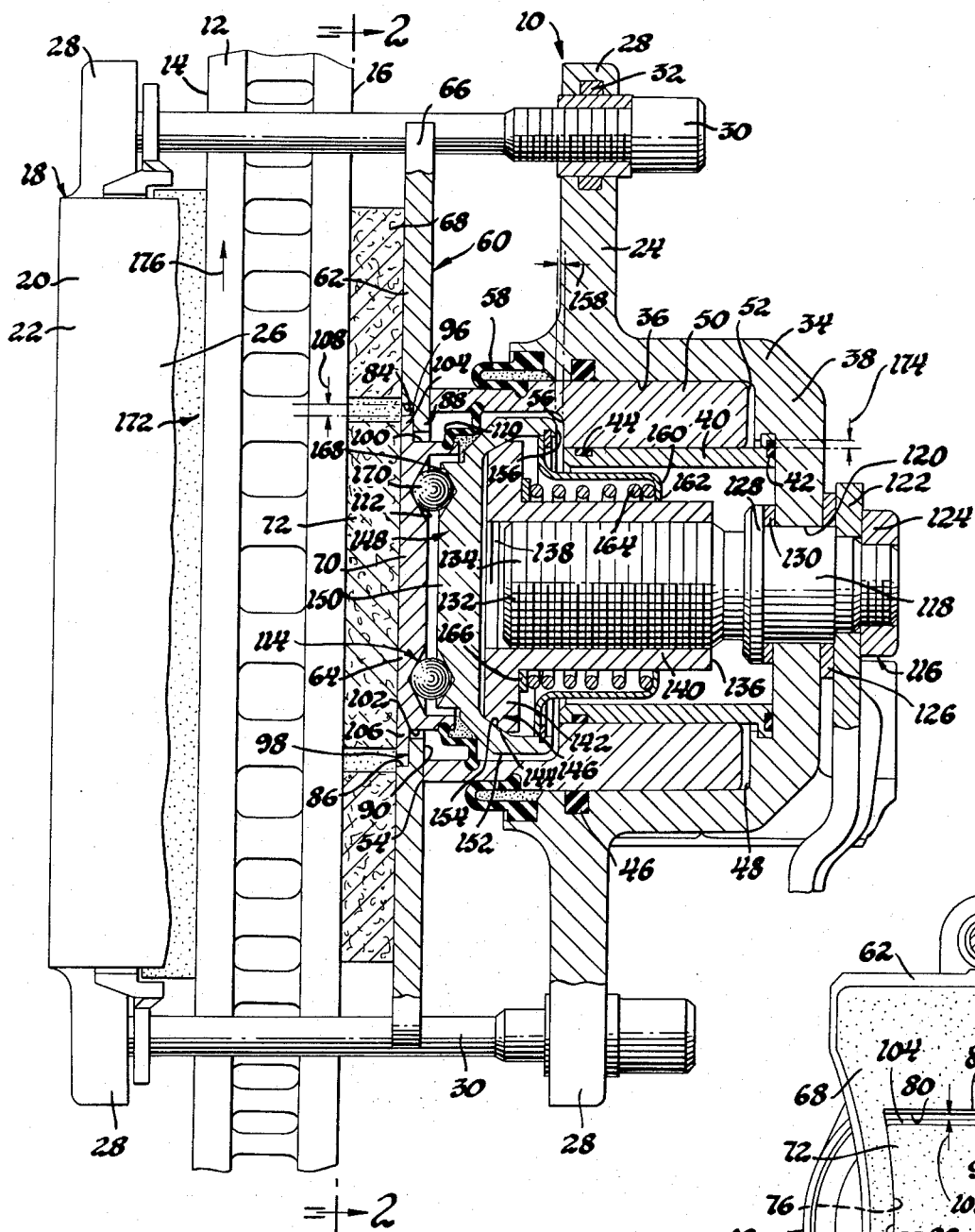
FIG. 1 is a cross-section view, with parts broken away, of a disc brake assembly embodying the invention.

The disc brake assembly 10 is illustrated as being of the sliding caliper type similar to those currently in production use on many passenger vehicles in the United States. The assembly includes a disc 12 to be braked, the disc having opposed friction surfaces 14 and 16. In the typical installation in a vehicle, the disc 12 is secured to a rotatable wheel so that the disc rotates with the wheel. The caliper assembly 18 includes caliper housing 20 formed to provide an outboard leg 22 and an inboard leg 24 joined by a bridging section 26. The circumferentially spaced sides of the legs are provided with ears 28 which are slidably received on mounting pins 30 forming a part of the fixed support for the caliper housing. The ears are provided with suitable bushings 32 so that the caliper housing can slide in directions axially of the disc as the brake pad linings wear.

The caliper housing inboard leg 24 is formed to provide a cylinder housing 34 containing cylinder 36. The cylinder is open at the end facing the disc 12 and is closed at its other end by a portion of the cylinder housing forming cylinder end wall 38. A sleeve 40 is secured to the cylinder end wall 38 in a suitable manner, such as by the use of rolling or staking, or the provision of a snap ring. The sleeve 40 is provided with an end seal 42 which seals against the cylinder end wall 38. It also has a seal 44 on its outer peripheral surface which is substantially aligned in a concentric manner with seal 46 of cylinder 36. Since sleeve 40 is spaced concentrically within cylinder 36, the cylinder and sleeve and end wall define an annular hydraulic pressure chamber 48. The provision of a small flange area on sleeve 40, which contains seal 42, with exposure to chamber 48, provides an area acted on by hydraulic pressure during hydraulic brake application which generates a force urging sleeve 40 against end wall 38 for a tight seal. An annular piston 50 is reciprocably received in the chamber formed by cylinder 36 and sleeve 40 so that the piston end wall 52 closes the pressure chamber 48.

Piston 50 extends outwardly of cylinder 36 toward disc 12 and terminates in an annular end wall 54. Intermediate the piston end walls 52 and 54 is a shoulder 56 formed on the piston so that the portion of the piston between shoulder 56 and end wall 54 has a larger inner diameter than does the portion of piston 50 between shoulder 56 and end wall 52. The outer surface of piston 50 has a boot 58 mounted on the piston and also on the enlarged portion of the cylinder housing at the open end of cylinder 36 to protect the cylinder and piston from foreign material.

The inner brake pad assembly 60, which is mounted on the caliper housing axially intermediate piston end wall 54 and disc 12, is constructed with a peripheral section 62 and a central section 64. Section 62 includes the peripheral shoe section 66 and peripheral lining section 68. The central brake pad assembly section 64 includes the central shoe section 70 and the central lining section 72. The peripheral shoe section 66 has an opening 74 which is non-circular so that the central shoe section received therein cannot rotate within the opening. Opening 74 is defined by radially inner and outer edges 76 and 78 and circumferentially spaced edges 80 and 82. Edges 80 and 82 are formed to provide shoulders 84 and 86, respectively, and they are respectively provided with lips 88 and 90 which extend slightly inwardly of the opening relative to shoulders 84 and 86. The peripheral lining section 68 is secured to the side of peripheral shoe section 66 adjacent shoulders 84 and 86, and therefore, lips 88 and 90 are on the side of the shoe section facing piston 50. The piston end wall 54 is in abutting engagement with that side of the peripheral shoe section 66, and surrounds the opening 74.

The shoe central section 70 is shaped much like opening 74 and has radially inner and outer edges 92 and 94 which respectively mate with opening edges 76 and 78 in such a manner that the central shoe section is guided while being permitted to move slightly in directions generally circumferential or tangential to the disc 12. The circumferentially spaced edges 96 and 98 of the shoe central section 70 respectively cooperate with opening edges 80 and 82. The central shoe section edges 96 and 98 are respectively formed to provide shoulders 100 and 102 and lips 104 and 106. Lips 88 and 104 overlap, as do lips 90 and 106, so that lip 104 is aligned to abut shoulder 84 in brake force transmitting relation as are lip 88 and shoulder 100, lip 90 and shoulder 92, and lip 106 and shoulder 86. However, the lips and shoulders are circumferentially spaced apart from this abutting relationship by a distance indicated by arrows 108 when the brake assembly is in the released position. As will be further described in the operation of the brake, this distance is taken up by circumferential movement of the brake pad assembly central section when the brake is mechanically actuated in the parking brake mode.

The inboard side of central shoe section 70 extends axially toward cylinder housing 34 and cooperates with a portion of piston 50 adjacent piston end wall 54 to mount a boot 110 which seals the interior of piston 50 from the entry of foreign material. This side of the shoe section 70 is also provided with ramps 112 located radially within the axially extending portion of the shoe section. These ramps are a part of a ball and ramp mechanism 114 which will be further described.

The mechanical brake actuating mechanism 116 includes a screw shaft 118 rotatably mounted in an aperture 120 formed in cylinder end wall 38 substantially on the same axis as that of cylinder 36. Screw shaft 118 has an actuating lever 122 secured to its outer end by a nut 124. The lever is suitably connected so as to be moved arcuately, thereby rotating shaft 118, by a parking brake arrangement such as a parking brake cable connected to be tensioned by a suitable pedal or lever arrangement accessible for operation by the vehicle operator. A washer-type spacer 126 may be provided between lever 122 and end wall 138. Shaft 118 has a thrust flange 128 engaging a thrust washer 130 on the inner side of end wall 38 which is capable of transmitting any thrust force from flange 128 to the cylinder end wall. The inner end 132 of shaft 118 is threaded with suitable screw threads 134 having a high lead. The threaded portion of shaft 118 extends through sleeve 40 toward the central shoe section 70 of the brake pad assembly 60. An adjuster nut 136 is internally threaded with screw threads 138 mating with screw threads 134. Nut 136 has a generally cylindrical body 140 terminating in a flange 142 at the end thereof nearest the brake pad assembly 60. An outer surface of the flange provides a clutch surface 144 of a clutch 146. An adjuster cone 148, mounted axially intermediate the adjuster nut 136 and the central shoe section 70, has an end wall 150 and an axially extending peripheral flange 152. This flange fits over the adjuster nut 136 and has a clutch surface 154 formed therein in mating relation with clutch surface 144 and forming a part of clutch 146. The annular end 156 of cone flange 152 is in axially spaced alignment with piston shoulder 56, the normal spacing with the brake released being indicated by arrows 158. Cone flange 152 also has secured to it a spring retainer 160, which is generally hat shaped and extends within cylinder sleeve 40. Retainer 160 is so formed to provide a seat 162 for compression spring 164, which is positioned about the adjuster nut body 140. The other end of spring 164 seats on a spring seat and thrust washer 166 which abuts against one side of adjuster nut flange 142. The preload of spring 164 continually urges clutch surfaces 144 and 154 toward clutching engagement.

The end wall 150 of cone 148 has ramps 168 formed therein and also providing a part of the ball and ramp mechanism 114. Balls 170 are received by the ramps 112 and 168 and complete the ball and ramp mechanism.

When the assembly functions as a service brake, it is hydraulically actuated. Fluid pressure is introduced into chamber 48 and this pressure acts on piston 50 and the cylinder end wall 38. The pressure forces the piston leftwardly as seen in FIG. 1 against the peripheral shoe section 66 so as to force the peripheral lining section 68 into braking engagement with surface 16 of disc 12. Since lips 88 and 90 of the peripheral shoe section overlap lips 104 and 106 of the central shoe section, any force exerted on the peripheral shoe section in the brake apply direction is also transmitted to the central shoe section. Therefore, the central lining section 72 is also moved into braking engagement with the disc surface 16. The pressure in chamber 48 acting on the cylinder end wall 38 causes the caliper housing to move rightwardly as seen in FIG. 1, sliding on pins 30, so as to move the outboard brake pad assembly 172 into braking engagement with the surface 14 of disc 12. The brake torque forces are transmitted from the brake pad assemblies 60 and 172 to the caliper housing bridging section 26, which in turn transmits these forces to a fixed portion of the brake assembly. This type of arrangement is disclosed in U.S. Pat. No. 3,628,639, entitled "Disc Brake Caliper Mounting Means." The sleeve 40 is subjected to a small pressure differential across the annular area indicated by arrows 174 which urges the sleeve more tightly into sealing engagement with the cylinder end wall 38 and assists in holding the sleeve in position.

When the central lining section 72 of brake pad assembly 60 engages disc surface 16 in braking relation, it moves circumferentially in the direction of disc rotation, subject to the guiding action of opening edges 76 and 78. Assuming the disc to be rotating in the direction of arrow 176, the central brake pad assembly 64 moves to close the space indicated by arrows 108 so that the brake torque is transmitted by shoulder 100 and lip 104 to lip 88 and shoulder 84. The clearance so taken up is sufficiently limited to permit this movement of the central pad assembly section 64 during hydraulic brake application without stopping the central brake pad assembly against the balls 170. Therefore, hydraulic brake applications are not self-energized. The spacing indicated by arrows 158 allows some apply movement of piston 50 without having the shoulder 56 of the piston engaging the end 156 of cone 148, thus making an allowance for caliper housing deflection without transmitting brake apply force through the ball and ramp assembly 114.

Figure 2:
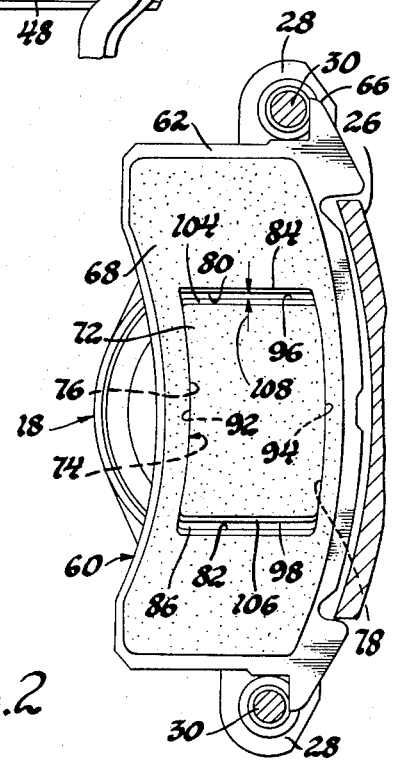
FIG. 2 is a view taken in the direction of arrows 2—2 of FIG. 1 and presenting an elevation view of the inboard brake pad assembly of FIG. 1.

The parking brake mode of operation is accomplished by moving the lever 122 arcuately, thus rotating screw shaft 118. The force so transmitted also tries to rotate the adjuster nut 136, but the nut is held against rotation by the cone clutch mechanism since clutch 146 is engaged under force of spring 164. Therefore, the force tries to rotate cone 148. However, the cone is prevented from rotation by the balls 170 in the ramps 112 and 168. The forces, therefore, try to rotate the central shoe section 70. This shoe section cannot rotate however, since it is received in a non-circular opening in the peripheral shoe section 66. The peripheral shoe section is prevented from rotation due to its torque transmitting connection with the caliper housing bridging section, best shown in FIG. 2. Therefore, on parking brake apply, the adjuster nut 136 must advance as the screw shaft 118 is rotated and the brake apply force acting axially due to this advance is transmitted through the clutch 146, the cone 148, and the ball and ramp mechanism 114 to the central shoe section 70. As the central shoe section engages the disc, it moves so as to reduce the clearance indicated by arrows 108, causing energization of the ball and ramp mechanism 114. The reaction back through the mechanism is taken by the thrust washer 130 which applies the outboard brake pad assembly 172 in the same manner as on hydraulic applications.

The space indicated by arrows 158 is approximately equal to the maximum housing deflection occurring in service braking. As the brake linings wear, this space is reduced and clearance develops across the balls 170 which must be taken up on parking brake apply. Eventually a hydraulic apply operation takes place in which the housing deflection exceeds the remaining space 158. The shoulder 56 of piston 50 then contacts the cone end 156, moving the cone toward the disc relative to the adjuster nut and disengaging clutch 146. The adjuster spring 164, acting through the low friction washer 166, causes the nut 136 to turn and advance on the screw shaft 118 until the clutch is once again engaged. When the hydraulic pressure is then released, clearance develops at 158 which is equal to the amount of caliper deflection from that brake apply. The difference between the original clearance at 158 and the resulting clearance is now the clearance across the balls 170. This allows for expansion of the central section lining 72 with temperature without dragging the lining on the disc. Any expansion of the peripheral section lining 68 merely pushes the piston 50 backwardly into cylinder 36.

The disc brake assembly embodying the invention retains the desirable non-energization effect of conventional disc brakes during hydraulic service brake actuation. It has the advantageous characteristic that less parking brake lever apply force is required since the parking brake is self-energized through the ball and ramp mechanism 114. If desired, the central section lining 72 can be of a different material with a higher coefficient of friction than the peripheral section lining 68, thereby further reducing the input parking brake apply force required. Any tendency of the cone clutch 146 to slip or wedge, depending upon the cone angle, is prevented in this construction. The cone angle is biased in the direction to wedge since the piston 50 will always be able to release the clutch under influence of brake apply pressure. This eliminates the possibility of cone slippage during mechanical brake applications.

What is claimed is:

1. A disc brake assembly comprising in combination:

a disc to be braked against rotation;
   a caliper assembly having a first brake pad assembly and a second brake pad assembly mounted thereon and movable to engage said disc in friction braking relation, one of said brake pad assemblies having a peripheral section and a central section mounted in and guided by and transmitting braking force to said peripheral section and including means for transmitting actuating forces from said peripheral section to said center section;
   first brake actuating means for actuating said one brake pad assembly peripheral section and thereby actuating said one brake pad central section and by reaction actuating the other of said brake pad assemblies;
   and second brake actuating means actuable independently of said first brake actuating means for actuating said one brake pad assembly central section and by reaction actuating the other of said brake pad assemblies and including self-energizing means for generating a self-energizing force that is effective only upon actuation of said second brake actuating means.

2. A disc brake comprising:
   a disc to be braked against rotation;
   a caliper assembly including:
   a caliper housing slidably mounted relative to said disc and having legs disposed on opposite sides of said disc and
   a bridging section joining said legs,
   a cylinder formed in one of said caliper legs and having a brake actuating piston reciprocably received therein,
   a first brake pad assembly mounted on said caliper housing axially intermediate the other of said caliper legs and said disc for friction braking engagement with said disc,
   a second brake pad assembly mounted on said caliper housing axially intermediate said one caliper leg and said disc for friction braking engagement with said disc,
   said second brake pad assembly including
   a peripheral shoe having a non-circular opening therein and a peripheral lining secured thereto, a non-circular central shoe received in said non-circular opening and having a central lining secured thereto,
   said central and peripheral shoes having overlapping lipped shoulders at the circumferentially spaced ends of said central shoe and providing spaced abutments for transmission of braking force from said central shoe to said peripheral shoe upon relative movement thereof in a circumferential direction to abut the cooperating pairs of said shoulders said peripheral lipped shoulders overlapping said central shoe lipped shoulders axially on the side thereof away from said disc, said peripheral shoe being engaged by said piston for braking actuation of said peripheral and central shoes and linings;
   and a manual brake actuator received in said caliper housing and including a threaded rotatable shaft having an adjuster nut thereon, a clutch formed by a clutch cone and a face on said adjuster nut, a ball and ramp assembly having one ramp means formed in said clutch cone and the other ramp means formed in said central shoe, and means urging said clutch into engagement;
   actuation of said manual brake actuator by rotation of said shaft acting through said nut and cone and ball and ramp assembly moving said central shoe axially to engage the lining thereof with said disc, the rotational movement of said disc moving said central shoe in a circumferential direction to energize said ball and ramp assembly to self-energize said brake, and reaction force being exerted from said shaft to said caliper housing to cause said first brake pad assembly to engage said disc in braking relation.

3. A disc brake actuator comprising:
   a caliper housing having a cylinder formed therein;
   an annular sleeve secured in said cylinder to define therewith an annular pressure chamber for hydraulic brake actuation;
   an annular piston reciprocably received in said cylinder and having one end forming one wall of said annular pressure chamber and the other end engaging a disc brake pad assembly peripheral section and having an inwardly extending shoulder thereon axially intermediate said piston ends and facing toward said disc brake pad assembly peripheral section;
   a mechanical brake actuating mechanism including a rotatable input shaft rotatably mounted in said housing in thrust bearing relation thereto and extending through said sleeve and having threads on the inner end thereof, a threaded adjuster nut mounted on said threaded shaft inner end within said annular piston and said annular sleeve and having a clutch surface formed on one end thereof axially inward of said annular sleeve, an adjuster cone received within said annular piston axially adjacent said piston other end and having a clutch surface formed on an inner surface thereof and cooperating with said adjuster nut clutch surface to provide a clutch, a spring retainer mounted on said cone and a compression spring acting on said retainer and said adjuster nut to urge said clutch into engagement, a self-energizing ball and ramp unit having a set of balls and opposed sets of ramps receiving said balls, one set of ramps formed in the end of said cone opposite said adjuster nut and the other set of ramps formed on a disc brake pad assembly central section mounted in said disc brake pad assembly peripheral section for limited movement relative to said disc brake pad assembly peripheral section and for brake torque force transmission thereto;

said cone having another end facing said annular piston shoulder and with the actuator released spaced therefrom by a distance substantially equal to caliper housing deflection with the actuator hydraulically actuated;

and the limited movement permitted in a disc circumferential direction between said disc brake pad assembly sections being less than the movement required to stop said disc brake pad assembly central section ramp set against said balls when the actuator is hydraulically actuated.

4. In a disc brake having a caliper housing and a hydraulic brake actuator and a mechanical brake actuator, a disc brake pad assembly comprising:

a first peripheral shoe section movable in a brake apply direction by one of said brake actuators and formed with an opening therethrough defined by edges including two edges spaced circumferentially relative to the disc to be braked and formed with shoulders and lips extending over said shoulders providing brake force receiving surfaces, and brake lining secured to said shoe section on the side thereof adjacent said shoulders and opposite said lips;

a second central shoe section movable in a brake apply direction by the other of said actuators and mating with and received in said first shoe section opening and having two edges spaced circumferentially relative to the disc to be braked and formed with shoulders and lips extending over said shoulders providing brake force transmitting surfaces, and brake lining secured to said second shoe section on the side thereof adjacent said lips and opposite said shoulders;

the shoulders and lips of said first and second shoe section overlapping while permitting limited movement of said second shoe section relative to said first shoe section in circumferential directions relative to the disc to be braked, the shoulders of said first shoe section and the lips of said second shoe section and the lips of said first shoe section and the shoulders of said second shoe section being aligned so as to transmit and receive therebetween brake force from said second shoe section to said first shoe section upon movement of said second shoe section to engage an edge thereof with an edge of said first shoe section in brake force transmitting relation, said lips of said shoe sections also transmitting brake apply force from said first shoe section to said second shoe section when said first shoe section is moved in the brake apply direction by one of the brake actuators.

* * * * *